US008649175B2

(12) United States Patent
Liu et al.

(10) Patent No.: US 8,649,175 B2
(45) Date of Patent: Feb. 11, 2014

(54) LOCKING MECHANISM AND AN ELECTRONIC DEVICE HAVING THE SAME

(75) Inventors: Xing Liu, New Taipei (TW); Chia-Ching Lee, New Taipei (TW); Xiu-Feng Cheng, New Taipei (TW)

(73) Assignee: Wistron Corporation, New Taipei (TW)

( * ) Notice: Subject to any disclaimer, the term of this patent is extended or adjusted under 35 U.S.C. 154(b) by 373 days.

(21) Appl. No.: 13/160,321

(22) Filed: Jun. 14, 2011

(65) Prior Publication Data

US 2012/0170182 A1 Jul. 5, 2012

(30) Foreign Application Priority Data

Jan. 4, 2011 (CN) .......................... 2011 1 0000321

(51) Int. Cl.
*G06F 1/16* (2006.01)

(52) U.S. Cl.
USPC ............ 361/679.58; 361/679.02; 361/679.21; 292/137; 292/156

(58) Field of Classification Search
USPC ....................................... 361/679.29, 679.58
See application file for complete search history.

(56) References Cited

U.S. PATENT DOCUMENTS

| | | | | |
|---|---|---|---|---|
| 5,497,296 | A * | 3/1996 | Satou et al. | 361/679.09 |
| 7,385,806 | B2 * | 6/2008 | Liao | 361/679.01 |
| 7,573,702 | B2 * | 8/2009 | Hong et al. | 361/679.26 |
| 7,940,520 | B2 * | 5/2011 | Bhutani | 361/679.21 |
| 8,319,099 | B2 * | 11/2012 | Xu et al. | 174/50 |
| 8,424,932 | B2 * | 4/2013 | Xu et al. | 292/163 |
| 8,482,911 | B2 * | 7/2013 | Kuo et al. | 361/679.27 |
| 2007/0014079 | A1 * | 1/2007 | Chen | 361/679 |

FOREIGN PATENT DOCUMENTS

| | | |
|---|---|---|
| TW | M391257 | 10/2000 |
| TW | 551024 | 9/2003 |
| TW | M298312 | 9/2006 |
| TW | M312853 | 5/2007 |
| TW | M323786 | 12/2007 |
| TW | M333597 | 6/2008 |

OTHER PUBLICATIONS

Office Action dated Sep. 5, 2013 with Search Report from the corresponding Taiwanese Patent Application No. 100100309 (8 pages) and abridged English translation (5 pages) and machine English translation using ABBYY PDF Transformer 3.0; Google Translator Toolkit.

* cited by examiner

*Primary Examiner* — Anthony Q Edwards

(74) *Attorney, Agent, or Firm* — Ladas & Parry, LLP

(57) ABSTRACT

A locking mechanism for locking an outer shell includes a frame adapted to be stacked with an outer shell and having a through hole for extension of an engaging piece of the outer shell therethrough, a locking element disposed movably on the frame, and a release button disposed slidably on the frame. The locking element has a hook-engaging portion, and a contact portion opposite to the hook-engaging portion. The hook-engaging portion is extendable to the through hole for engaging releasably the engaging piece. The release button has one end abutting against the contact portion. The release button is operable to push the contact portion, which in turn moves the hook-engaging portion to disengage from the engaging piece.

20 Claims, 12 Drawing Sheets

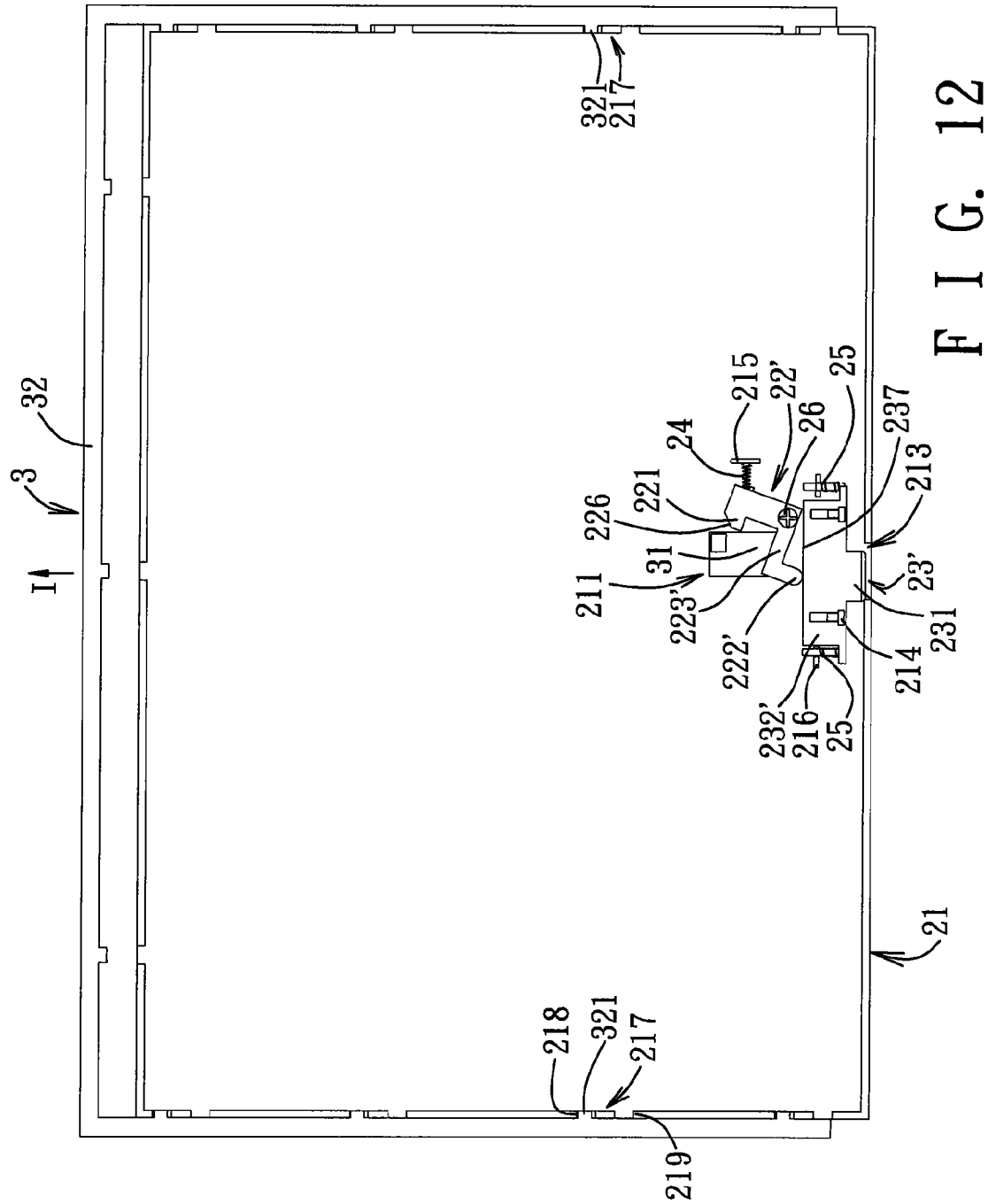

LOCKING MECHANISM AND AN ELECTRONIC DEVICE HAVING THE SAME

CROSS-REFERENCE TO RELATED APPLICATIONS

This application claims priority of Chinese Patent Application No. 201110000321.8 filed on Jan. 4, 2011, the disclosures of which is incorporated herein by reference.

BACKGROUND OF THE INVENTION

1. Field of the Invention

This invention relates to a locking mechanism, and more particularly to a locking mechanism having a locking element that is movable between a lock position and an unlock position to lock and release an outer shell to and from a frame, respectively, and an electronic device having the locking mechanism.

2. Description of the Related Art

Currently, an outer shell of a notebook computer can be changed to a different color and pattern according to a user's requirement or preference. For example, Taiwanese Patent No. M312853 discloses a notebook computer having a changeable display screen outer shell. In this patent, the display screen outer shell includes first and second outer shells. The first outer shell is fixed to the display panel, and includes a first connecting portion. The second outer shell includes a second connecting portion corresponding to the first connecting portion. Through a detachable connection between the first and second connecting portions, the second outer shell can be selectively changed.

SUMMARY OF THE INVENTION

A main object of the present invention is to provide a locking mechanism having a simple structure that can minimize production costs thereof and that can permit quick and easy locking or releasing of an outer shell and a frame.

Another object of the present invention is to provide an electronic device having a locking mechanism. The locking mechanism has a simple structure that can minimize production costs and that can enable quick and easy locking or releasing of an outer shell and a frame.

The purpose of the present invention and the solution to the conventional technical problems are achieved through employment of the below technical means. According to one aspect of disclosure of the present invention, a locking mechanism for locking an outer shell comprises a frame, a locking element, and a release button. The frame is adapted to be stacked with an outer shell, and has a through hole for extension of an engaging piece of the outer shell therethrough. The locking element is disposed movably on the frame, and has a hook-engaging portion, and a contact portion opposite to the hook-engaging portion. The hook-engaging portion is extendable to the through hole for engaging releasably the engaging piece. The release button is disposed slidably on the frame, and has one end abutting against the contact portion. The release button is operable to push the contact portion, which in turn moves the hook-engaging portion to disengage from the engaging piece.

The purpose of the present invention and the solution to the conventional technical problems may also be achieved through employment of the below technical means.

The frame of the locking mechanism includes two opposite first sides, and a second side connected transversely between the first sides. The through hole is disposed between the first sides, and is spaced apart from the second side. The hook-engaging portion is disposed adjacent to the through hole. The contact portion is disposed adjacent to the release button. The release button is disposed adjacent to the second side, and normally projecting out of the second side. The release button pushes the contact portion when pressed.

The locking mechanism further includes a first return spring to bias the hook-engaging portion to move toward the through hole for engaging the engaging piece of the outer shell. The hook-engaging portion has an inclined contact face facing in a direction opposite to the release button and adapted to be abuttable against the engaging piece. The hook-engaging portion is adapted to move away from the through hole by the engaging piece when the engaging piece pushes the inclined contact face.

The locking element further includes a slide portion connected between the hook-engaging portion and the contact portion, and a slide rail receiving slidably the slide portion. The slide portion is slidable in a direction transverse to a direction that the button moves.

The contact portion has a first slanting face facing the release button. The release button includes a second slanting face to contact the first slanting face. Through this configuration, the release button can push the locking element to slide relative to the frame.

The hook-engaging portion has an inclined contact face facing in a direction opposite to the release button and adapted to be abuttable against the engaging piece. The hook-engaging portion is adapted to move away from the through hole by the engaging piece when the engaging piece pushes the inclined contact face.

In another embodiment, the locking element further includes a lever portion connected between the hook-engaging portion and the contact portion. The lever portion is connected pivotally to the frame. The frame includes a pivot pin inserted into the lever portion.

The contact portion has a rounded contact face contacting the release button. Through this configuration, friction with the release button can be reduced, so that the release button can smoothly push the locking element to pivot.

The hook-engaging portion has an inclined contact face facing in a direction opposite to the release button and adapted to be abuttable against the engaging piece. The hook-engaging portion is adapted to move away from said through hole by the engaging piece when the engaging piece pushes the inclined contact face.

The second side of the frame is formed with a notch. The release button normally projects out of the notch, and has an elongated guide groove extending in a direction transverse to the second side. The frame includes a projection disposed in the guide groove and abutting against the release button. The locking mechanism further includes a second return spring to bias the release button to project out of the notch.

According to another aspect of this invention, an electronic device comprises an outer shell, a frame, a locking element, and a release button. The outer shell includes an engaging piece. The frame is stacked with the outer shell, and has a through hole for extension of the engaging piece therethrough. The locking element is disposed movably on the frame, and has a hook-engaging portion, and a contact portion opposite to the hook-engaging portion. The hook-engaging portion is extendable to the through hole to engage releasably the engaging piece. The release button is disposed slidably on the frame, and has one end abutting against the contact portion. The release button is operable to push the contact portion, which in turn moves the hook-engaging portion to disengage from the engaging piece.

The engaging piece has an L-shaped cross section, and is engageable with the hook-engaging portion. Through this configuration, the engaging piece can be prevented from moving out of the hook-engaging portion when the engaging piece moves rearwardly.

The outer shell further includes a plurality of spaced-apart retaining elements provided on opposite first and second sides thereof. The frame further includes a plurality of spaced-apart retaining grooves provided on the first and second sides of the frame. Each retaining groove has an aligning groove portion, and a retaining groove portion communicated with the aligning groove portion. Each retaining element extends into the aligning groove portion of one of the retaining grooves, and engages the retaining groove portion of the one of the retaining grooves. Through this configuration, the outer shell can be stably mounted to the frame.

Through the aforesaid technical means, an advantage of the electronic device having the locking mechanism according to the present invention resides in the configuration of the locking element of the locking mechanism and the release button, which permits the outer shell to be quickly and easily locked to or released from the frame. Hence, changing of the outer shell to a different color and pattern can be facilitated.

BRIEF DESCRIPTION OF THE DRAWINGS

Other features and advantages of the present invention will become apparent in the following detailed description of the embodiments of the invention, with reference to the accompanying drawings, in which:

FIG. 12 is a view similar to FIG. 11, but illustrating the engaging piece of the outer shell sliding to an aligning groove portion of an engaging groove in a frame of the locking mechanism.

DETAILED DESCRIPTION OF THE PREFERRED EMBODIMENTS

Figure 1:
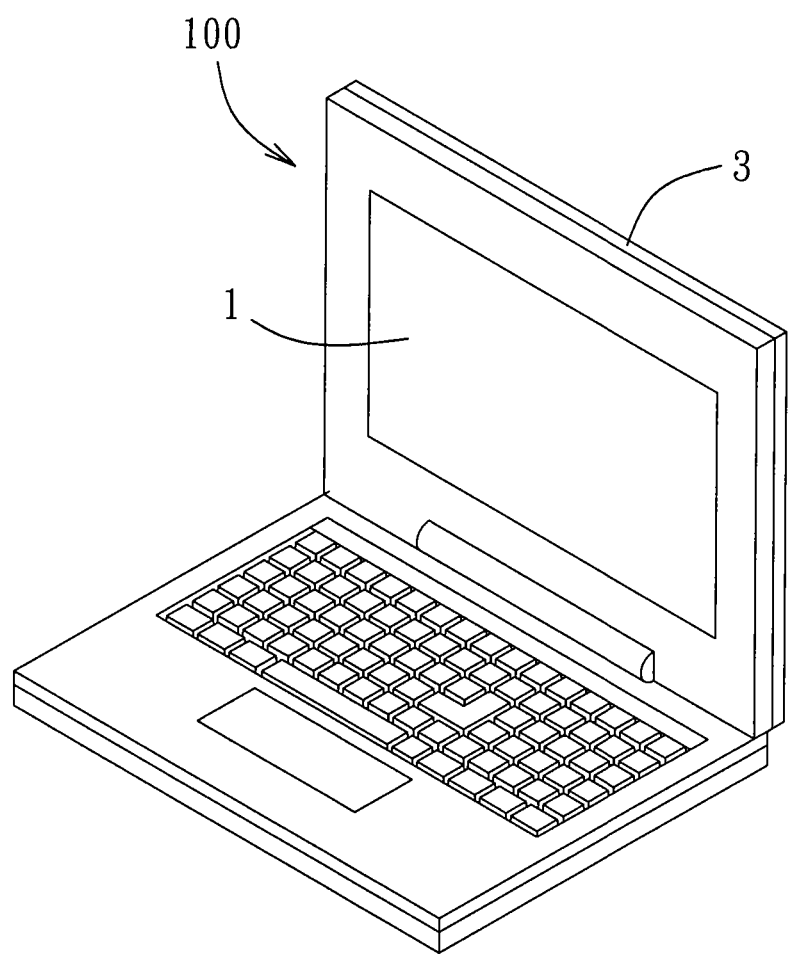
FIG. 1 is a perspective view of an electronic device having a locking mechanism according to the first embodiment of the present invention.

The above-mentioned and other technical contents, features, and effects of this invention will be clearly presented from the following detailed description of the two embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Referring to FIGS. 1 to 7, an electronic device 100 according to the first embodiment of the present invention is exemplified as a notebook computer, and is shown to comprise a display screen 1, a locking mechanism 2, and an outer shell 3. The electronic device 100 may also be a tablet computer, a mobile phone, or a personal digital assistant.

Figure 2:
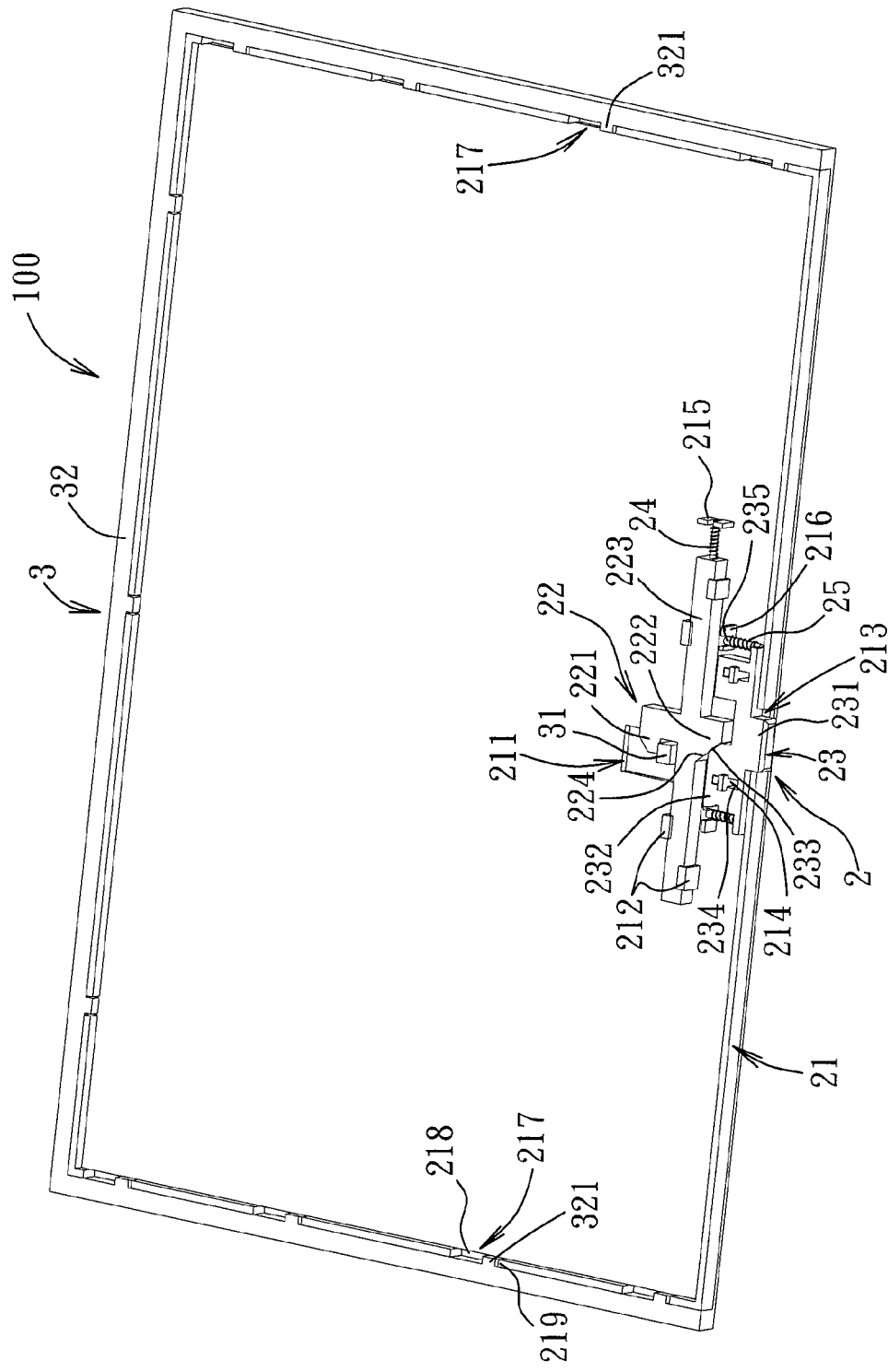
FIG. 2 is a perspective view of a locking mechanism and an outer shell of the first embodiment in an assembled state.
Figure 3:
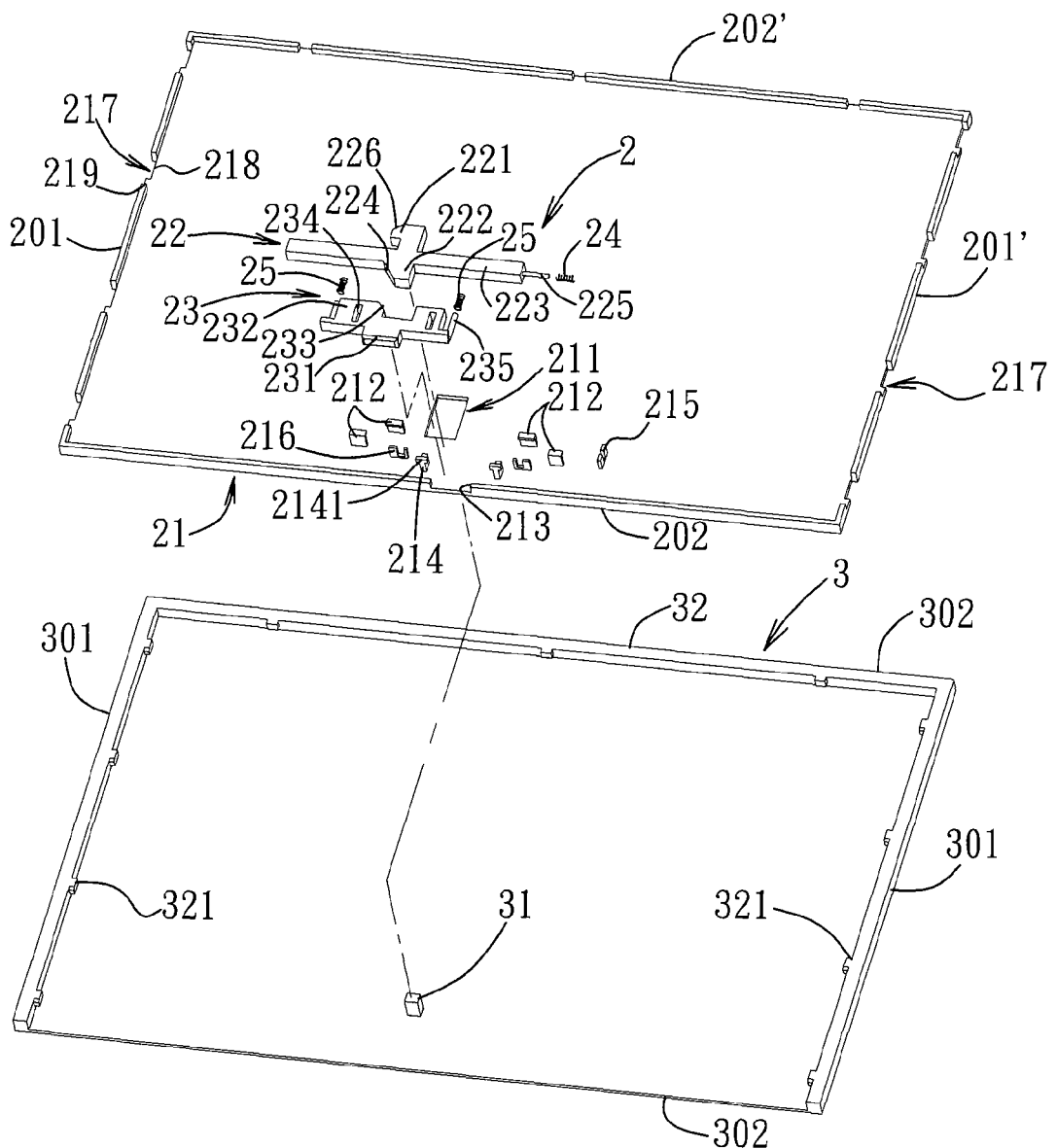
FIG. 3 is an exploded perspective view of the locking mechanism and the outer shell of FIG. 2.
Figure 4:
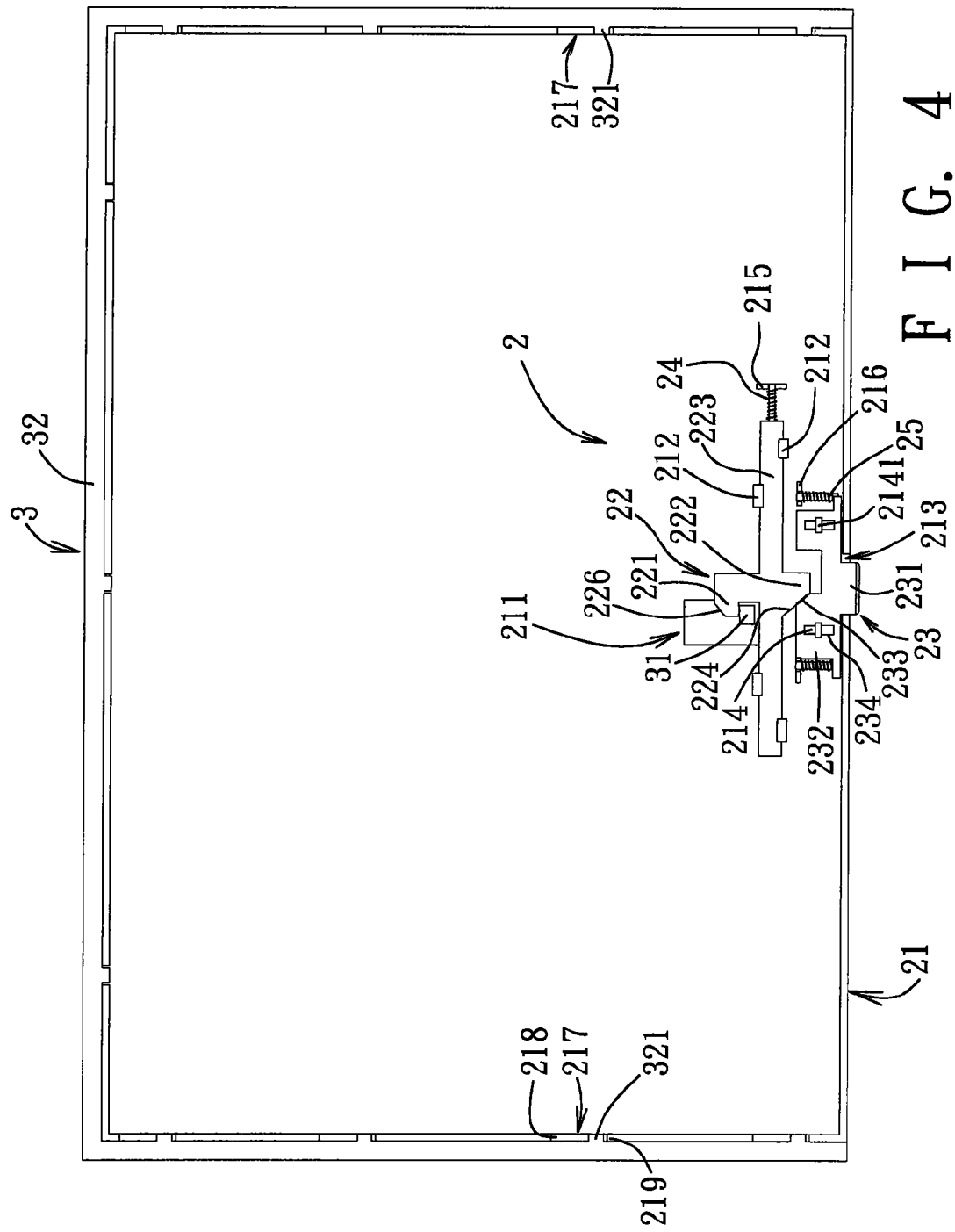
FIG. 4 is a schematic view of the locking mechanism and the outer shell of the first embodiment, illustrating a hook-engaging portion of a locking element in a lock position.

With reference to FIGS. 2 to 4, the locking mechanism 2 includes a frame 21 covering a rear side of the display screen 1 (see FIG. 1) and having a through hole 211. The frame 21 includes two opposite first sides 201, 201', and two opposite second sides 202, 202' connected transversely between the first sides 201, 201'. The through hole 211 is disposed between the first sides 201, 201', and is spaced apart from the second side 202. The outer shell 3 is stacked on the frame 21, and covers removably an outer surface of the frame 21. The outer shell 3 includes an engaging piece 31 extendable to the through hole 211.

The locking mechanism 2 further includes a locking element 22 and a release button 23. The locking element 22 is disposed movably on an inner surface of the frame 21, and includes a hook-engaging portion 221 disposed adjacent to the through hole 211, and a contact portion 222 opposite to the hook-engaging portion 221 and disposed adjacent to the release button 23. The hook-engaging portion 221 is extendable to the through hole 211 to engage releasably the engaging piece 31. The release button 23 is disposed slidably on the frame 21, and has one end abutting against the contact portion 222. The release button 23 is operable by a user. Through this configuration, when the release button 23 is pressed inward, the release button 23 pushes the contact portion 222, which in turn moves the hook-engaging portion 221 to disengage from the engaging piece 31 so that the hook-engaging portion 221 is disposed in an unlock position.

In this embodiment, the locking element 22 further includes a slide portion 223 connected between the hook-engaging portion 221 and the contact portion 222 and extending in a left-right direction. The slide portion 223 is slidable in a left-right direction transverse to a direction that the release button 23 moves, i.e., in a top-bottom direction. The hook-engaging portion 221 and the contact portion 222 are disposed respectively on top and bottom sides of the slide portion 223. The frame 21 further includes a slide rail composed of a plurality of spaced-apart guide elements 212 projecting from the inner surface thereof and receiving slidably the slide portion 223. Each guide element 212 has an L-shaped cross section. The guide elements 212 abut against the top and bottom sides of the slide portion 223 to restrict sliding movement of the slide portion 223 relative to the frame 21 along the left-right direction.

The second side 202 of the frame 21 is formed with a notch 213. The release button 23 is disposed adjacent to the second side 202, and normally projects out of the notch 213. The release button 23 includes a press portion 231 extendable out of the notch 213, and a push portion 232 opposite to the press portion 231 and abutting against the contact portion 222. The contact portion 222 has a first slanting face 224 slanting downward from the slide portion 223 and facing the release button 23. The push portion 232 has a second slanting face 233 to contact the first slanting face 224. When the press portion 231 is pressed inward, because the second slanting face 233 applies a force to the first slanting face 224, the push portion 232 pushes the contact portion 222 to move rightward. The contact portion 222, in turn, moves the hook-engaging portion 221 to disengage from the engaging piece 31. The hook-engaging portion 221 has an inclined contact face 226 facing in a direction opposite to the release button 23 and abuttable against the engaging piece 31 of the outer shell 3.

The push portion 232 is formed with two elongated guide grooves 234 spaced apart in the left-right direction and extending in a direction transverse to the second side 202, i.e., in the top-bottom direction. The frame 21 further includes two projections 214 projecting from the inner surface and spaced apart in the left-right direction. Each projection 214 is inserted into a respective guide groove 234, and has a head part 2141 projecting out from the guide groove 234 and abutting against an end face of the push portion 232 that is opposite to the inner surface of the frame 21. As such, removal of the release button 23 from the frame 21 can be prevented. Further, through guiding of the projections 214, the release button 23 can slide along the guide grooves 234 relative to the frame 21 to ensure that when the press portion 231 is pressed, the second slanting face 233 can press against the first slanting face 224.

The locking mechanism 2 further includes a first return spring 24 configured as a compression spring and sleeved on a pin 225 that projects from a right end of the slide portion 223. Two opposite ends of the first return spring 24 respectively abut against the slide portion 223 and an abutment plate 215 projecting on the inner surface of the frame 21. The first return spring 24 biases the hook-engaging portion 221 to move toward the through hole 211 to engage the engaging piece 31 of the outer shell 3 and to provide the locking element 22 with a return force. Through contact between the first slanting face 224 and the second slanting face 233, the first return spring 24 not only can provide the locking element 22 with the return force, but also can simultaneously provide the release button 23 with a return force through pressing of the first slanting face 224 against the second slanting face 233.

Moreover, the locking mechanism further includes two second return springs 25 respectively configured as compression springs and respectively sleeved on posts 235 that project upward from left and right ends of the push portion 232, respectively. Two opposite ends of each second return spring 25 respectively abut against the push portion 232 and an abutment plate 216 projecting on the inner surface of the frame 21. The second return springs 25 bias the press portion 231 of the release button 23 to project out of the notch 213. Thus, because the second return springs 25 provide the release button 23 with a return force, when the press portion 231 is released by the user, the release button 23 can return to a position where the press portion 231 projects out of the notch 213, as shown in FIGS. 2 and 4.

Additionally, the frame 21 further includes a plurality of spaced-apart retaining grooves 217 formed in the left and right sides 201, 201'. Each retaining groove 217 has an aligning groove portion 218, and a retaining groove portion 219 disposed below and communicated with the aligning groove portion 218. The outer shell 3 further includes an inverted U-shaped surrounding wall 32 having left and right sides provided respectively with a plurality of spaced-apart retaining elements 321 to engage releasably the respective retaining grooves 217. Each retaining element 321 extends into the aligning groove portion 218 of one of the retaining grooves 217, and then moves downward to engage the retaining groove portion 219. When the outer shell 3 covers the outer surface of the frame 21, the hook-engaging portion 221 of the locking element 22 is engaged to the engaging piece 31 of the outer shell 3. Simultaneously, the retaining elements 321 are retained within the retaining grooves 217. Through this configuration, the outer shell 3 is stably connected to the frame 21.

With reference to FIG. 4, through the biasing force of the first return spring 24, the hook-engaging portion 221 of the locking element 22 is disposed in the lock position, and is engaged to the engaging piece 31. Simultaneously, through the biasing force of the second return springs 25 and through contact between the first and second slanting faces 224, 233, the press portion 231 of the release button 23 projects out of the notch 213. At this time, each retaining element 321 is retained within the retaining groove portion 219 of the respective retaining groove 217, and the outer shell 3 is stably connected to the frame 21, and will not slide relative to the frame 21, so that removal of each retaining element 321 from the aligning groove portion 218 of the respective retaining groove 217 can be prevented.

Figure 5:
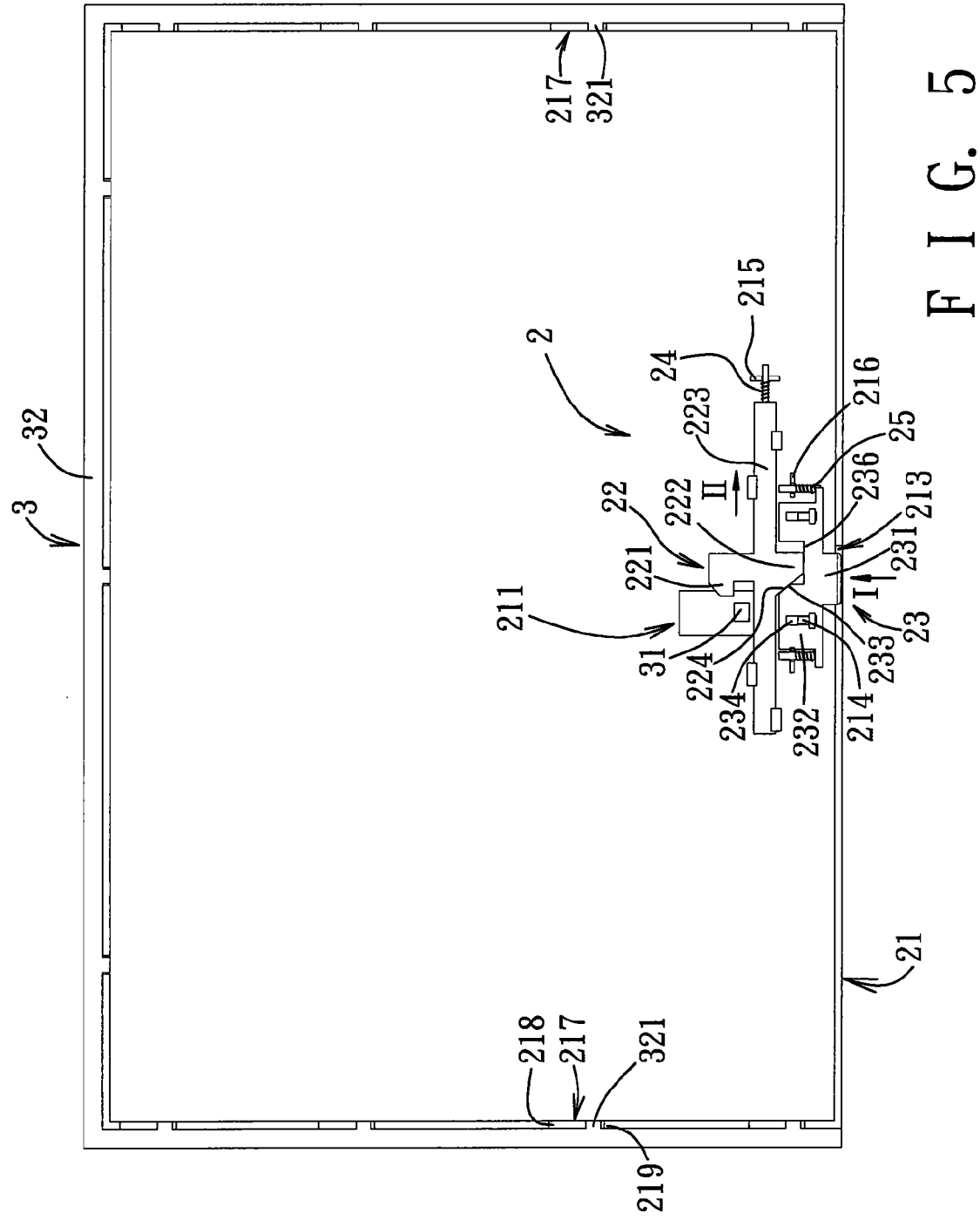
FIG. 5 is a view similar to FIG. 4, but illustrating the hook-engaging portion of the locking element in an unlock position.
Figure 6:
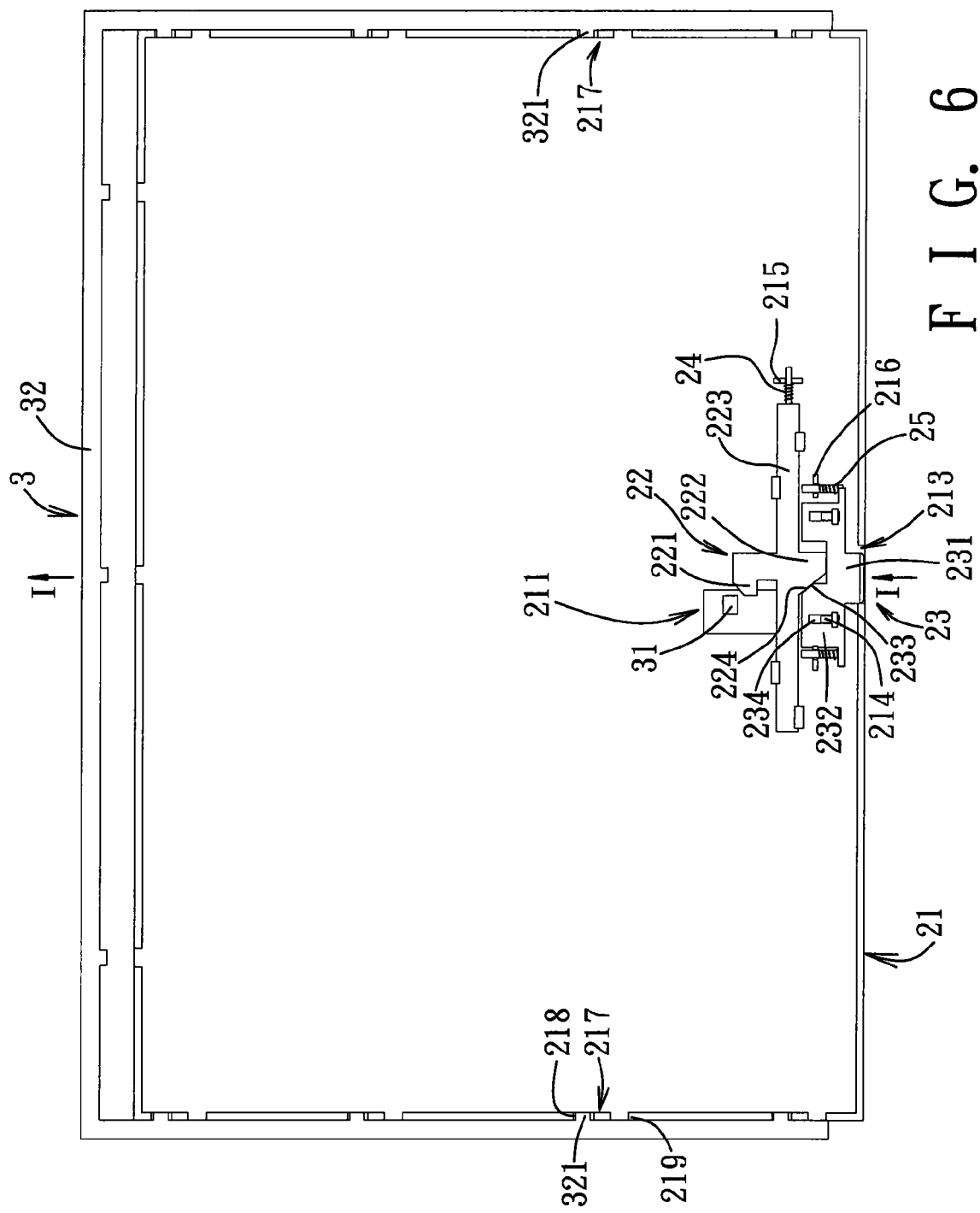
FIG. 6 is a view similar to FIG. 4, but illustrating an engaging piece of the outer shell sliding to an aligning groove portion of an engaging groove in a frame of the locking mechanism.

With reference to FIGS. 5 and 6, to release the outer shell 3 from the frame 21, the press portion 231 of the release button 23 is pressed inward in the direction of an arrow (I). The second slanting face 233 applies a force on the first slanting face 224 to gradually push the locking element 22 to move rightward in the direction of an arrow (II). The second return springs 25 are compressed at this time. As the locking element 22 continues to move rightward, the hook-engaging portion 221 moves gradually away from the engaging piece 31 to disengage from the same. The first return spring 24 is compressed at this time. When an end face 236 of the push portion 232 abuts against a bottom end of the contact portion 222, the movement of the locking element 22 is stopped. At this time, the hook-engaging portion 221 is in an unlock position, and is completely disengaged from the engaging piece 31.

When the hook-engaging portion 221 is in the unlock position, the outer shell 3 can be pushed upward in the direction of the arrow (I) to move each retaining element 321 of the outer shell 3 from the retaining groove portion 219 to the aligning groove portion 218 of the respective retaining groove 217. Afterwards, the outer shell 3 is moved rearward to release each retaining element 321 from the respective retaining groove 217 via the aligning groove portion 218 and to disengage the engaging piece 31 from the through hole 211. Hence, the outer shell 3 can be completely released from the frame 21. The outer shell 3 may then be replaced with a different color and pattern according to the user's requirement or preference. When the outer shell 3 is released from the frame 21, the pressing of the press portion 231 of the release button 23 is released, and the locking element 22 and the release button 23 are moved back to their original positions shown in FIG. 4 through the return forces of the first and second return springs 24, 25.

Figure 7:
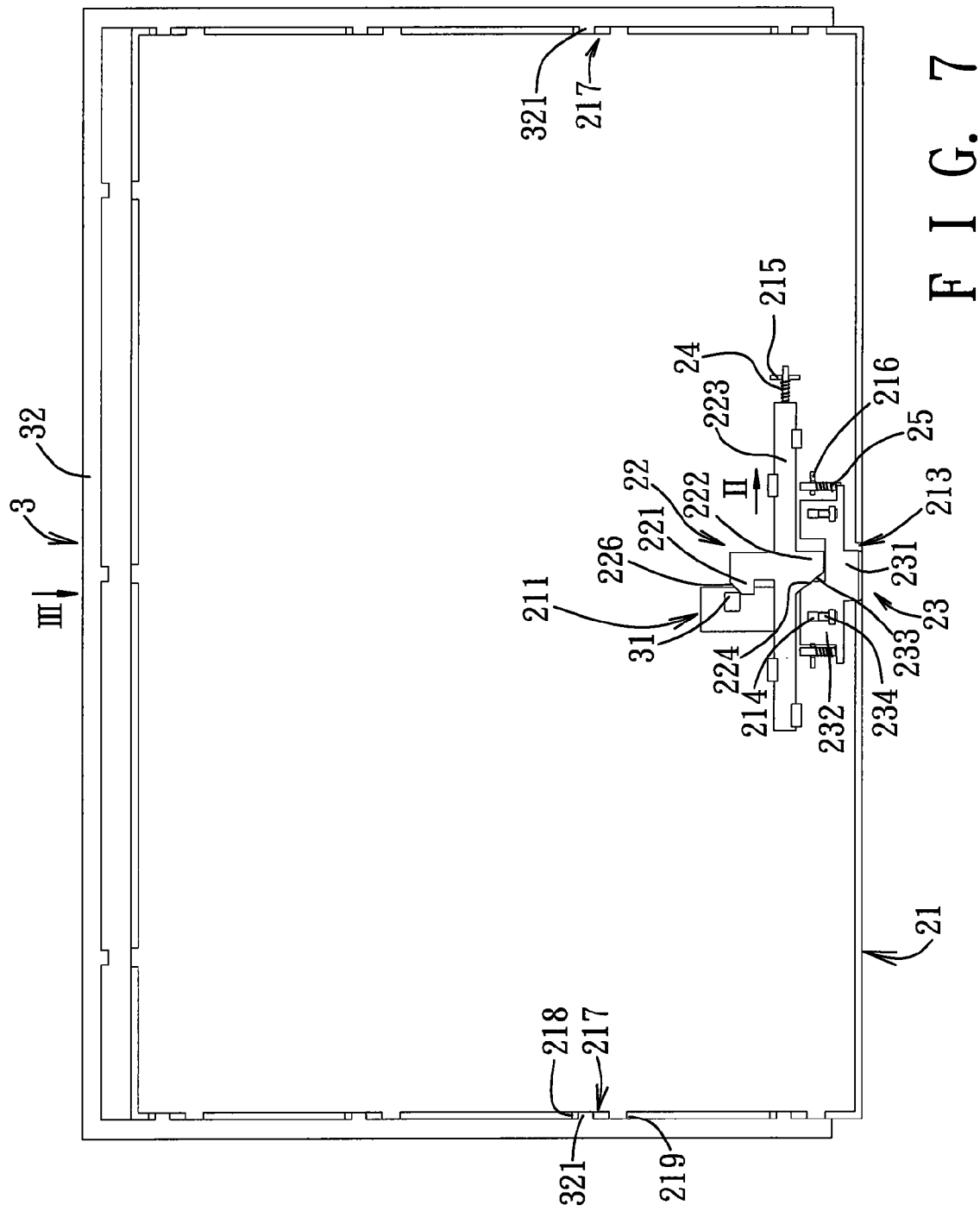
FIG. 7 is a view similar to FIG. 4, but illustrating the engaging piece of the outer shell abutting against an inclined contact face of the hook-engaging portion.

With reference to FIG. 7, to assemble a new outer shell 3 on the frame 21, the engaging piece 31 is aligned with the through hole 211, and the retaining elements 321 of the outer shell 3 are aligned with the aligning groove portions 218 of the respective retaining grooves 217. Afterwards, the outer shell 3 is moved close to the frame 21 to extend the engaging piece 31 through the through hole 211 and to insert each retaining element 321 into the aligning groove portion 218 of the respective retaining groove 217. Subsequently, the outer shell 3 is moved downward in the direction of an arrow (III). When the engaging piece 31 contacts the inclined contact face 226 of the hook-engaging portion 221, the engaging piece 31 applies a force on the inclined contact face 226 to move the hook-engaging portion 221 away from the through hole 211 in the direction of the arrow (II). As the engaging piece 31 moves past the hook-engaging portion 221 and engages with the same, as shown in FIG. 4, through the return force of the first return spring 24, the locking element 22 is returned to its original position shown in FIG. 4. Simultaneously, each retaining element 321 is moved to retain within the retaining groove portion 219 of the respective retaining groove 217, as best shown in FIG. 4.

Figure 8:
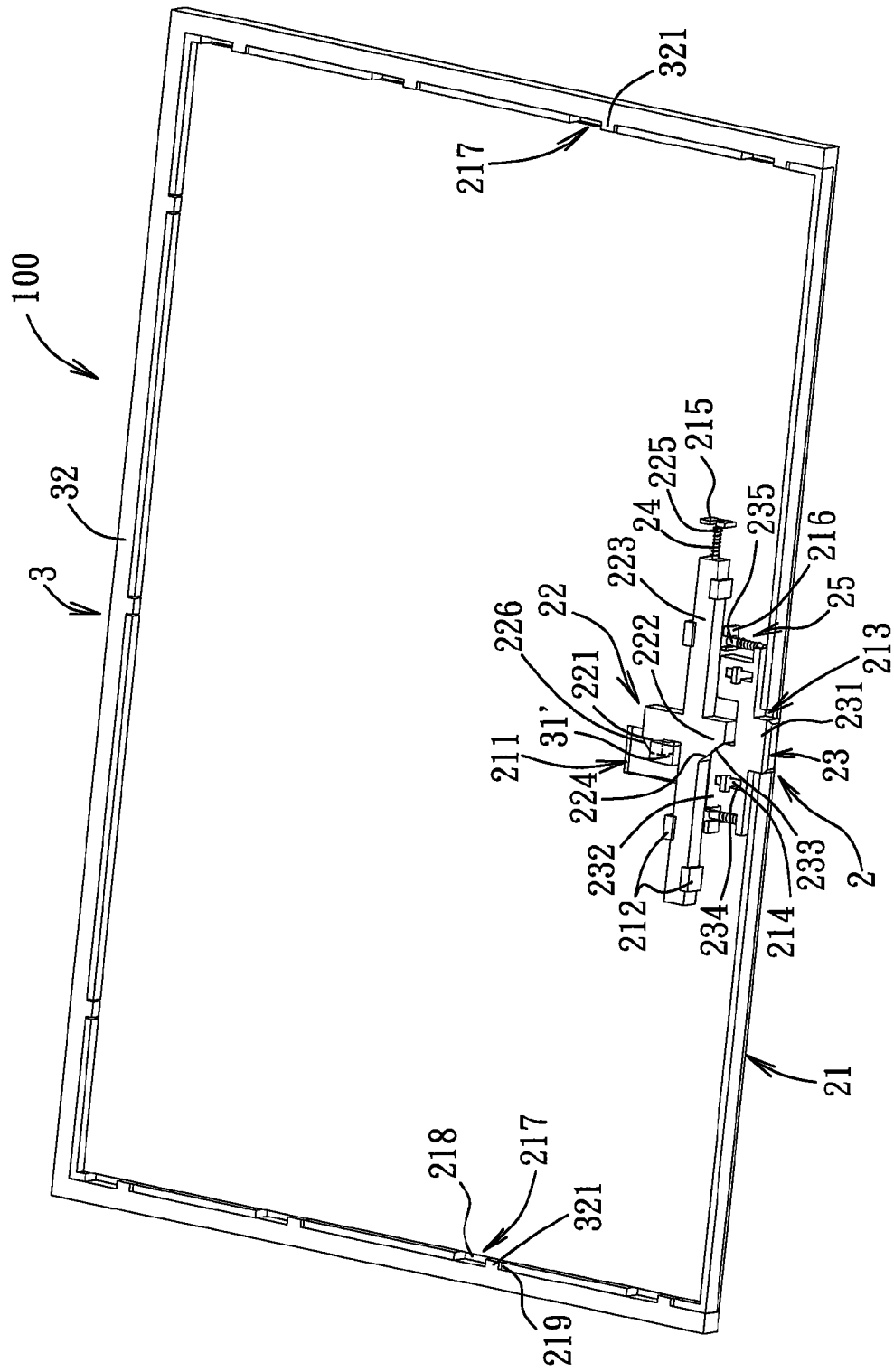
FIG. 8 is a perspective view of an alternative form of the engaging piece of the outer shell of the first embodiment.

In an alternative embodiment, as shown in FIG. 8, the engaging piece 31' of the outer shell 3 may have an L-shaped cross section, so that the engaging piece 31' can engage an end face of the hook-engaging portion 221 that is opposite to the inner surface of the frame 21. Through this configuration, the engaging piece 31' can be prevented from moving rearward and out of engagement with the hook-engaging portion 221.

Referring to FIGS. 9 to 12, an electronic device 100 according to the second embodiment of the present invention is shown to be similar to the first embodiment. The difference between the first and second embodiments resides in the construction of the locking element 22' and the release button 23'.

In this embodiment, instead of the slide portion 223, the locking element 22' includes a lever portion 223' connected between the hook-engaging portion 221 and the contact portion 222'. The lever portion 223' is connected pivotally to the frame 21, and has a pivot hole 227. The frame 21 includes a pivot pin 220 projecting from the inner surface and inserted into the pivot hole 227. Through this configuration, the locking element 22' can pivot relative to the frame 21 about the pivot pin 220. The locking mechanism 2 further includes a screw 26 extending through the pivot hole 227 and engaged threadedly to the pivot pin 220. Ahead of the screw 26 abuts against an end face of the lever portion 223' that is opposite to the inner surface of the frame 21 to prevent separation of the pivot pin 220 from the pivot hole 227.

The contact portion 222' is spaced apart from the pivot hole 227, and is disposed on a left side of the pivot hole 227. The contact portion 222' has a rounded contact face 228 contacting an end face 237 of the push portion 232' of the release button 23'. When the end face 237 of the push portion 232' pushes the rounded contact face 228, the locking element 22' can pivot relative to the frame 21 about the pivot pin 220. Further, through the rounded configuration of the contact face 228 of the contact portion 222', friction between the end face 237 and the rounded contact face 228 can be reduced, so that the push portion 232' can smoothly push the locking element 22' to pivot.

Figure 9:
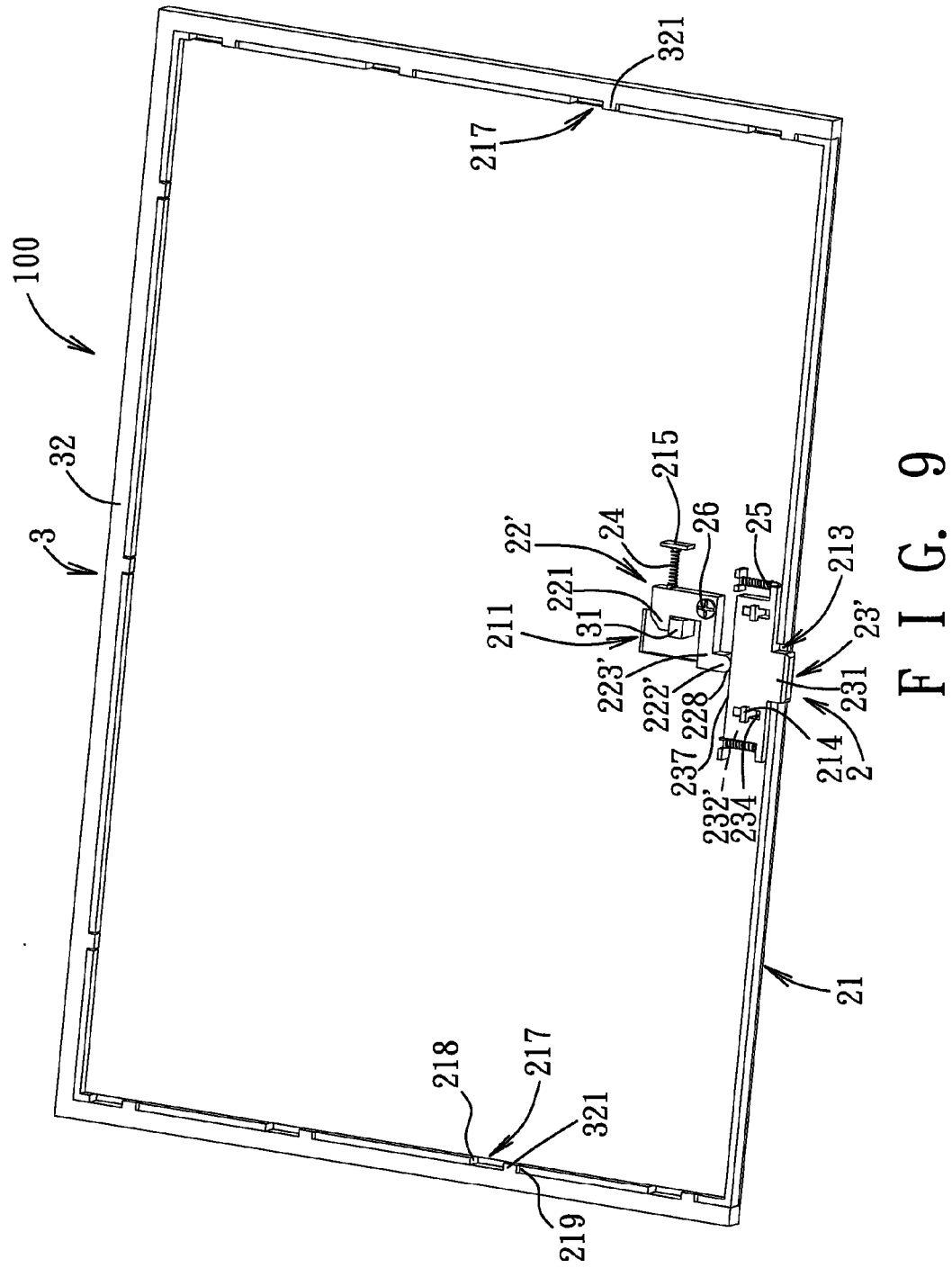
FIG. 9 is a perspective view of a locking mechanism and an outer shell of an electronic device according to the second embodiment of the present invention in an assembled state.
Figure 10:
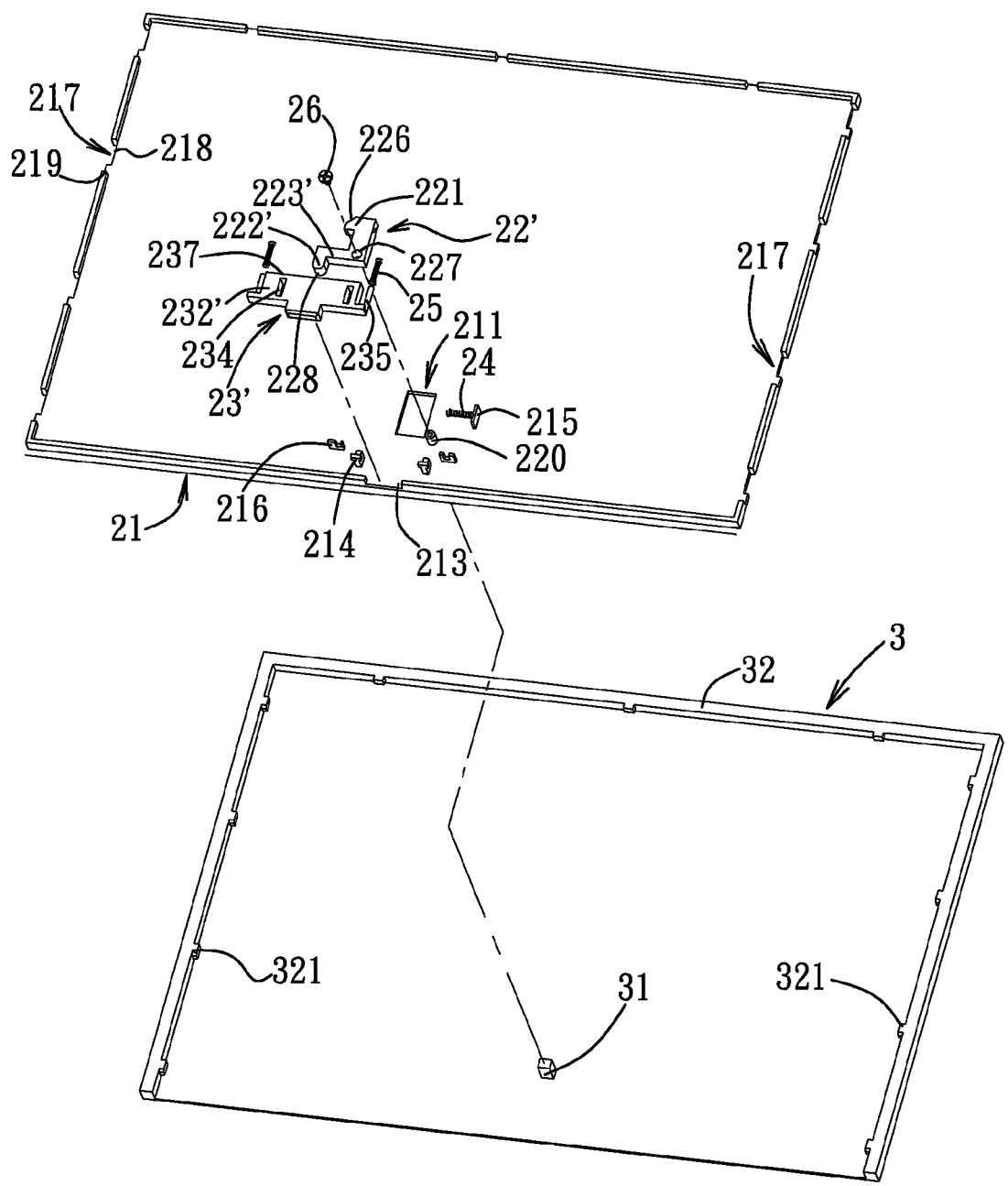
FIG. 10 is an exploded perspective view of the locking mechanism and the outer shell of FIG. 9.

With reference to FIG. 9, through the return force of the first return spring 24, the hook-engaging portion 221 of the locking element 22' is biased to move to the lock position, and engages a top end of the engaging piece 31 of the outer shell 3. Simultaneously, through the return force of the second return springs 25 and through contact between the rounded contact face 228 and the end face 237 of the push portion 232', the press portion 231 of the release button 23' can project out of the notch 213.

Figure 11:
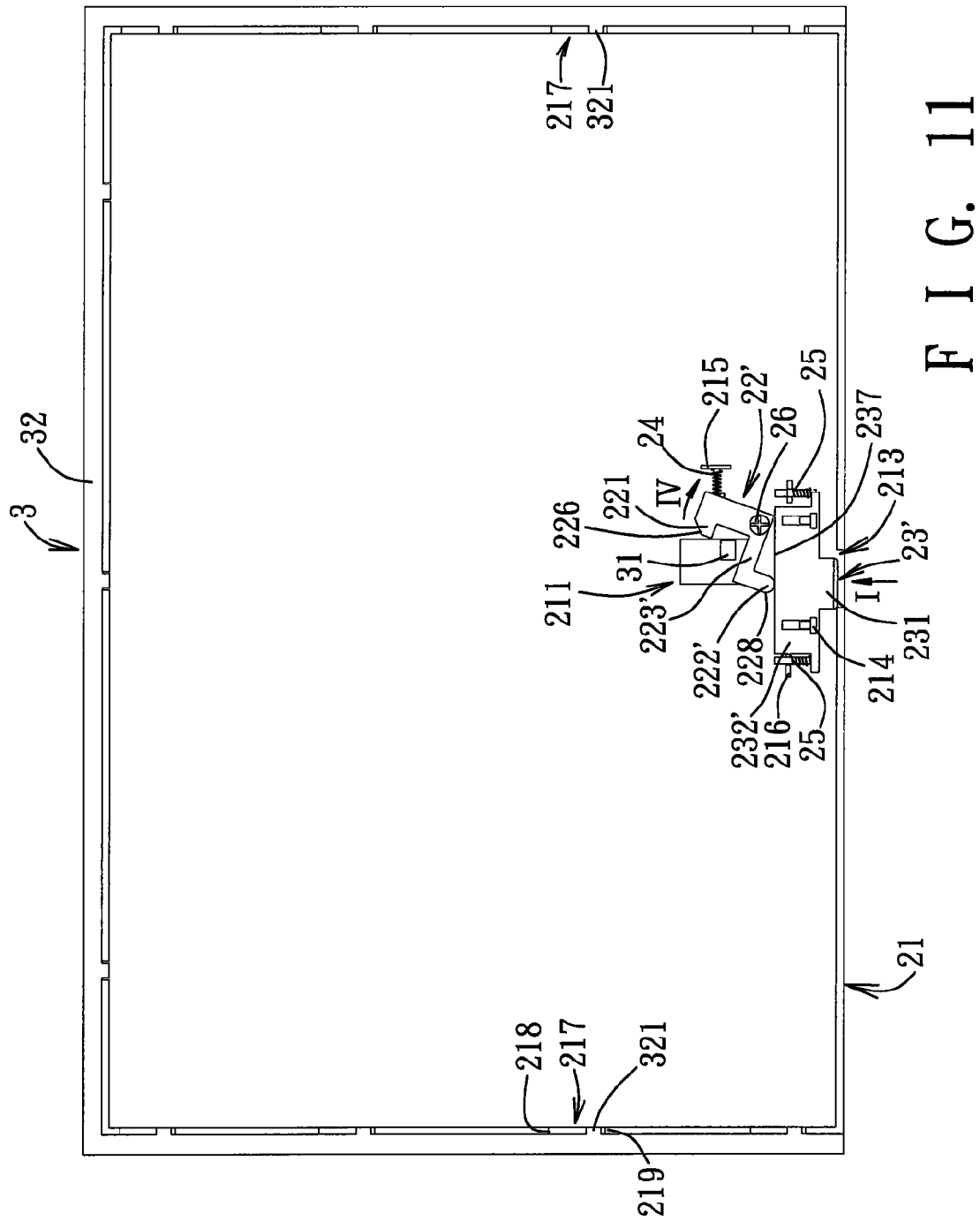
FIG. 11 is a schematic view of the locking mechanism and the outer shell of the second embodiment, illustrating a hook-engaging portion of a locking element in an unlock position.

With reference to FIGS. 11 and 12, to release the outer shell 3 from the frame 21, the press portion 231 is pressed inward in the direction of the arrow (I), and the end face 237 of the push portion 232' pushes the rounded contact face 228 of the contact portion 222', which in turn moves the locking element 22' to pivot about the pivot pin 220 in the direction of an arrow (IV). The second return springs 25 are compressed at this time. As the locking element 22' pivots in the direction of the arrow (IV), the hook-engaging portion 221 is moved away from the engaging piece 31 to disengage from the same, and compresses the first return spring 24. When a bottom end of the lever portion 223' abuts against the end face 237 of the push portion 232', the release button 23' is stopped from pushing the locking element 22'. At this time, the hook-engaging portion 221 is disposed in the unlock position, and is completely disengaged from the engaging piece 31. The outer shell 3 is then pushed upward in the direction of the arrow (I) to move the retaining elements 321 from the retaining groove portions 219 to the aligning groove portions 218 of the retaining grooves 217, after which the outer shell 3 is moved rearward to disengage the retaining elements 321 from the retaining grooves 217 and the engaging piece 31 from the through hole 211.

From the aforesaid description, through the configurations of the locking element 22, 22' and the release button 23, 23', the electronic device 100 of the two embodiments can permit quick and easy locking or releasing the outer shell 3 to or from the frame 21, so that changing of the outer shell 3 to a different color and pattern can be facilitated. Hence, the objects of the present invention can be realized.

While the present invention has been described in connection with what are considered the most practical and embodiments, it is understood that this invention is not limited to the disclosed embodiments but is intended to cover various arrangements included within the spirit and scope of the broadest interpretations and equivalent arrangements.

We claim:

1. A locking mechanism for locking an outer shell, comprising:
   a frame adapted to be stacked with the outer shell and having a through hole for extension of an engaging piece of the outer shell therethrough;
   a locking element disposed movably on said frame and having a hook-engaging portion, and a contact portion opposite to said hook-engaging portion, said hook-engaging portion being extendable to said through hole for engaging releasably the engaging piece; and
   a release button disposed slidably on said frame and having one end abutting against said contact portion, said release button being operable to push said contact portion, which in turn moves said hook-engaging portion to disengage from the engaging piece.

2. The locking mechanism of claim 1, wherein said frame includes two opposite first sides, and a second side connected transversely between said first sides, said through hole being disposed between said first sides and spaced apart from said second side, said hook-engaging portion being disposed adjacent to said through hole, said contact portion being disposed adjacent to said release button, said release button being disposed adjacent to said second side, and normally projecting out of said second side, said release button pushing said contact portion when pressed.

3. The locking mechanism of claim 2, further including a first return spring to bias said hook-engaging portion to move toward said through hole for engaging the engaging piece of the outer shell.

4. The locking mechanism of claim 3, wherein said hook-engaging portion has an inclined contact face facing in a direction opposite to said release button and adapted to be abuttable against the engaging piece, said hook-engaging portion being adapted to move away from said through hole by the engaging piece when the engaging piece pushes said inclined contact face.

5. The locking mechanism of claim 4, wherein said locking element further includes a slide portion connected between said hook-engaging portion and said contact portion, and a slide rail receiving slidably said slide portion, said slide portion being slidable in a direction transverse to a direction that said button moves.

6. The locking mechanism of claim 5, wherein said contact portion has a first slanting face facing said release button, said release button including a second slanting face to contact said first slanting face.

7. The locking mechanism of claim 4, wherein said locking element further includes a lever portion connected between said hook-engaging portion and said contact portion, said lever portion being connected pivotally to said frame, said frame including a pivot pin inserted into said lever portion.

8. The locking mechanism of claim 7, wherein said contact portion has a rounded contact face contacting said release button.

9. The locking mechanism of claim 2, wherein said second side of said frame is formed with a notch, said release button normally projecting out of said notch, said release button having an elongated guide groove extending in a direction transverse to said second side, said frame including a projection inserted in said guide groove, said locking mechanism further including a second return spring to bias said release button to project out of said notch.

10. An electronic device, comprising:
an outer shell including an engaging piece;
a frame stacked with said outer shell and having a through hole for extension of said engaging piece therethrough;
a locking element disposed movably on said frame and having a hook-engaging portion, and a contact portion opposite to said hook-engaging portion, said hook-engaging portion being extendable to said through hole to engage releasably said engaging piece; and
a release button disposed slidably on said frame and having one end abutting against said contact portion, said release button being operable to push said contact portion, which in turn moves said hook-engaging portion to disengage from said engaging piece.

11. The electronic device of claim 10, wherein said frame includes two opposite first sides, and a second side connected transversely between said first sides, said through hole being disposed between said first sides and spaced apart from said second side, said hook-engaging portion being disposed adjacent to said through hole, said contact portion being disposed adjacent to said release button, said release button being disposed adjacent to said second side, and normally projecting out of said second side, said release button pushing said contact portion when pressed.

12. The electronic device of claim 11, further including a first return spring to bias said hook-engaging portion to move toward said through hole and engage said engaging piece.

13. The electronic device of claim 12, wherein said hook-engaging portion has an inclined contact face facing in a direction opposite to said release button and abuttable against said engaging piece, said hook-engaging portion being moved away from said through hole by said engaging piece when said engaging piece pushes said inclined contact face.

14. The electronic device of claim 13, wherein said locking element further includes a slide portion connected between said hook-engaging portion and said contact portion, and a slide rail receiving slidably said slide portion, said slide portion being slidable in a direction transverse to a direction that said release button moves.

15. The electronic device of claim 14, wherein said contact portion has a first slanting face facing said release button, said release button including a second slanting face to contact said first slanting face.

16. The electronic device of claim 13, wherein said locking element further includes a lever portion connected between said hook-engaging portion and said contact portion, said lever portion being connected pivotally to said frame, said frame including a pivot pin inserted into said lever portion.

17. The electronic device of claim 16, wherein said contact portion has a rounded contact face contacting said release button.

18. The electronic device of claim 11, wherein said engaging piece has an L-shaped cross section, and is engageable with said hook-engaging portion.

19. The electronic device of claim 11, wherein said second side of said frame is formed with a notch, said release button normally projecting out of said notch, said release button having an elongated guide groove extending in a direction transverse to said second side, said frame including a projection disposed in said guide groove and abutting against said release button, said locking mechanism further including a second return spring to bias said release button to project out of said notch.

20. The electronic device of claim 11, wherein said outer shell further includes a plurality of spaced-apart retaining elements provided on opposite first and second sides thereof, said frame further including a plurality of spaced-apart retaining grooves provided on said first and second sides of said frame, each of said retaining grooves having an aligning groove portion, and a retaining groove portion communicated with said aligning groove portion, each of said retaining elements extending into said aligning groove portion of one of said retaining grooves, and engaging said retaining groove portion of said one of said retaining grooves.

* * * * *